United States Patent [19]

Scifres

[11] Patent Number: 5,713,654
[45] Date of Patent: Feb. 3, 1998

[54] ADDRESSABLE LASER VEHICLE LIGHTS

[75] Inventor: Donald R. Scifres, San Jose, Calif.

[73] Assignee: SDL, Inc., San Jose, Calif.

[21] Appl. No.: 313,757

[22] Filed: Sep. 28, 1994

[51] Int. Cl.$^6$ ..................................................... F21V 8/00
[52] U.S. Cl. ........................... 362/80; 362/32; 362/259; 362/231; 362/800; 340/435
[58] Field of Search ............................. 362/61, 80, 32, 362/245, 259, 241, 294, 373, 800, 249, 246, 20; 340/472, 435

[56] References Cited

U.S. PATENT DOCUMENTS

| | | | |
|---|---|---|---|
| 4,694,295 | 9/1987 | Miller et al. | 340/435 |
| 4,868,718 | 9/1989 | Davenport et al. | 362/32 |
| 4,930,049 | 5/1990 | Davenport et al. | 362/32 |
| 4,932,747 | 6/1990 | Russell et al. | 362/32 |
| 5,184,883 | 5/1992 | Finch et al. | 362/32 |
| 5,278,731 | 1/1994 | Davenport et al. | 362/32 |
| 5,311,410 | 5/1994 | Hsu et al. | 362/20 |
| 5,365,413 | 11/1994 | Krammer | 362/259 |
| 5,400,225 | 3/1995 | Currie | 362/32 |
| 5,436,805 | 7/1995 | Hsu et al. | 362/294 |
| 5,438,487 | 8/1995 | Schmid et al. | 362/800 |
| 5,452,186 | 9/1995 | Dassanayake | 362/32 |
| 5,477,436 | 12/1995 | Bertling et al. | 362/259 |

FOREIGN PATENT DOCUMENTS

| | | | |
|---|---|---|---|
| 4010825 | 3/1991 | Germany | 362/259 |

*Primary Examiner*—Ira S. Lazarus
*Assistant Examiner*—Thomas M. Sember
*Attorney, Agent, or Firm*—Thomas Schneck

[57] ABSTRACT

A vehicle lighting system using individually addressable laser diodes or laser arrays coupled to a fiber optic waveguide. A plurality of laser light sources are grouped together and conveniently located on the vehicle. Each laser light source is individually addressable and produces a beam that is coupled to a fiber optic waveguide. The waveguide distally transmits the beam to various optical loads on the vehicle. Alternatively, each fiber optic waveguide may be coupled to receive a beam from more than one laser light source. This allows switching to an operational light source should one fail. In this manner, the operational life of the system is increased.

50 Claims, 6 Drawing Sheets

ADDRESSABLE LASER VEHICLE LIGHTS

TECHNICAL FIELD

The present invention pertains to the field of illumination, and more particularly to vehicle lighting systems.

BACKGROUND ART

Numerous efforts have been made to increase the safety, reliability and efficiency of motor vehicles and aircraft while reducing the overall cost of manufacturing. Essential to meeting these goals is incorporating new and expanding technologies into the manufacturing process and the vehicle itself. Optical technology has offered many benefits by providing less expensive and more reliable light sources than were previously available. Specifically, efforts have been made to provide alternative lighting systems which substantially reduce the number of light bulbs in a vehicle lighting system. These systems reduce the weight of the vehicle as well as increase the operational life of the vehicle's electrical system by reducing the electrical load on it.

U.S. Pat. No. 5,311,410 to Hsu et al. is one example of an alternative lighting system in which a central light source distributes white light, through fiber optic cables, to various areas of a vehicle. The central light source includes high intensity discharge lamps. The fiber optic cables distribute light to various optical loads of the vehicle's lighting system, including headlamps, tail lights and dome lights. The flux of the light is controlled through mechanical switches that move segments of the fiber optic cables into and out of alignment.

Another example of an alternative lighting system is disclosed in U.S. Pat. No. 4,930,049 to Davenport et al. in which a light bus network distributes high intensity white light from a central light source to various components of a vehicle. The light bus network includes a number of electromechanical controls such as shutters, as well as collimating and focusing lenses.

Yet another example of a lighting system in which light from a central light source is carried by a series of optical fibers to an array of headlight lenses is disclosed in U.S. Pat. No. 4,868,718 to Davenport et al. In this patent, the ends of the fibers are held in stationary alignment with their respective lenses, while optical wedges or rotating flat members are inserted between the fibers and their respective lenses to shift between high and low beams.

The prior art lighting systems, however, have the disadvantage of requiring numerous mechanical components to distribute light throughout a vehicle, thereby increasing both the size and weight of the system.

It is an object of the present invention to provide an improved vehicle lighting system that is lightweight and has a longer operational life than those disclosed in the prior art.

It is a further object of the present invention to provide an improved vehicle lighting system that consumes substantially less power and provides better space utilization than those currently in use in vehicles.

SUMMARY OF THE INVENTION

These objectives have been achieved by providing a vehicle with a plurality of individually addressable laser light sources, each of which produce a beam of light that is optically coupled to a fiber optic waveguide. The laser light sources are grouped together and conveniently located on the vehicle. The fiber optic waveguide distally transmits the beam to the optical loads of the vehicle, including the brake lights, taillights, instrumentation lights and turn signals. Each fiber optic waveguide may be a single strand of optical fiber having a numerical aperture large enough to produce the requisite amount of illumination. Considering that some optical loads require a larger flux of light greater than a single optic fiber can transmit, it is understood that the waveguide may comprise of a bundle of optical fibers. Therefore, for purposes of the disclosed invention, a waveguide is defined as the apparatus along which light propagates to an optical load.

A circuit is electronically coupled to each laser light source to independently activate it or alter its brightness by adjusting the supplied current. The structure of the laser light sources and the waveguides coupled to them is relatively small and lightweight. In addition, the laser light sources consume less power than conventional incandescent light bulbs and thus increase the operational life of the vehicle's electrical system.

Conveniently locating the light sources as a single group provides many advantages. The grouping of the light sources facilitates reducing power fluctuations due to temperature variations by abrogating multiple heat-transfer devices. Instead, the temperature of the present invention may be held constant by means of a single thermal electric cooler or constant temperature surface. Further, conveniently locating the group of light sources allows easy access for maintenance.

In another embodiment, multiple laser light sources are associated with each fiber optic waveguide to provide redundant laser sources. This has the advantage of allowing one or more of the laser sources to fail without substantially affecting the intensity of light emitted from the waveguide.

BEST MODE FOR CARRYING OUT THE INVENTION

Figure 1:
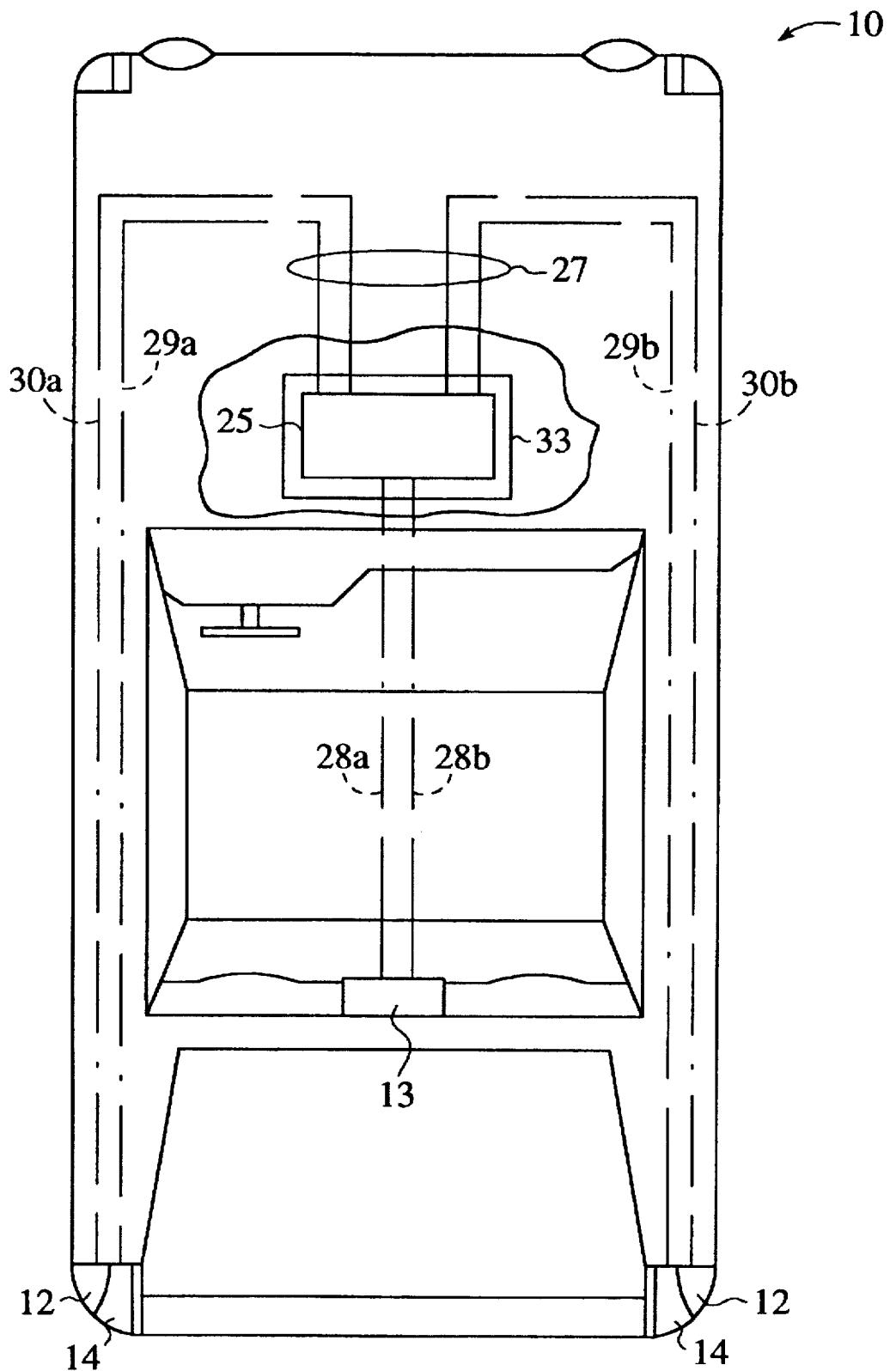
FIG. 1 is a top view of a vehicle showing the positions of the various optical loads in the present invention.

FIG. 1 shows a vehicle 10 equipped with taillights 12 and a high mounted brake light 13, commonly known as a collision avoidance light. Each taillight also includes a brake light 14. These lights provide essential information to the driver of a following vehicle concerning the operation of the vehicle 10. Specifically, these lights signal the deceleration of the vehicle upon which they are mounted. Recent studies show that the high mounted brake light 13 substantially reduces the number of accidents occurring from vehicles being rear-ended.

A group of laser light sources 25 is conveniently located on the vehicle 10. A fiber optical network 27 transmits light produced by the laser light sources 25 to various optical loads of the vehicle. For example, fiber optic waveguides 28a and 28b transmit light to the collision avoidance light 13; fiber optic waveguides 29a and 29b transmit light to brake lights 14; and fiber optic waveguides 30a and 30b transmit light to taillights 12. Each fiber optic waveguide may be a single strand of optical fiber having a numerical aperture large enough to produce the requisite level of illumination. However, each fiber optic waveguide may comprise of a bundle of optical fibers. Conveniently locating the laser light sources 25 allows controlling the temperature of the laser source to reduce power fluctuations associated with temperature changes. To this end, a single thermal electric cooler 33 is shown coupled to the laser light sources 25. In addition, the laser light sources 25 may be conveniently placed to allow access for maintenance.

The laser light sources 25 are each typically composed of light emitting semiconductor material that emits a 3 mW to 3 W beam having a wavelength in the visible range of 400–700 nm and for red lights 620–700 nm. Lasers that emit this wavelength are usually composed of AlInGaP or InGaAsP disposed on a substrate of GaAs. These semiconductor lasers are commercially available as the SDL 7000 series. Alternatively, individual laser diodes may be used, as well as semiconductor lasers made from other materials, e.g., GaN, AlGaAs, AlGaP, or ZnSe. As a still further alternative, arrays of frequency doubled diode lasers could be used to create blue or green colors.

Figure 2A:
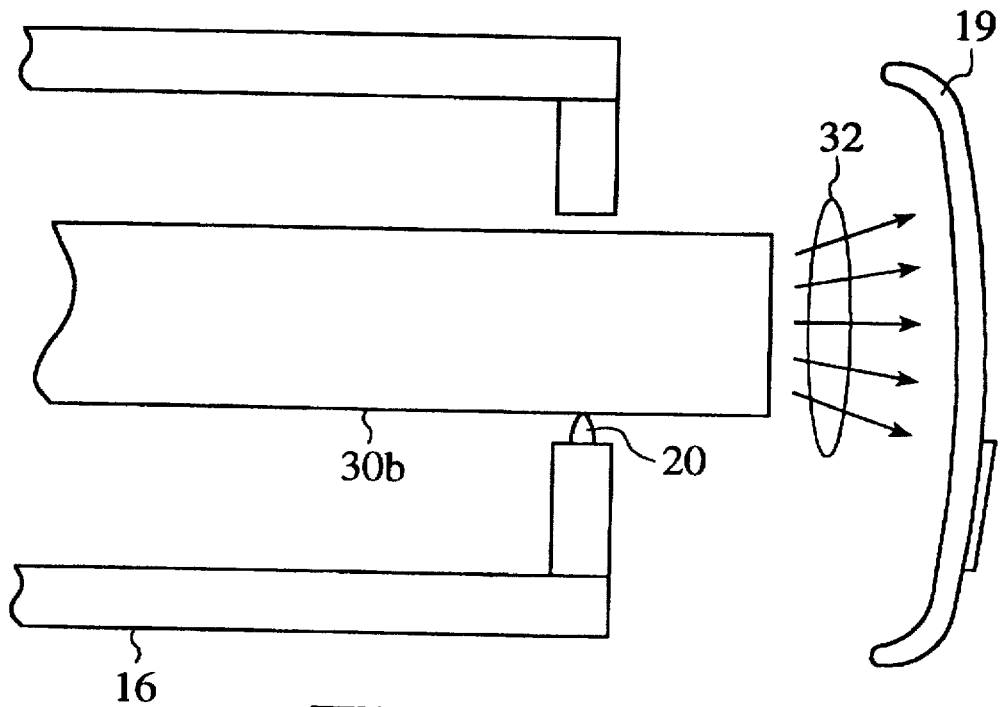
FIG. 2A is a plan view of a fiber optic waveguide placed in the housing of an optical load of a vehicle according to the present invention.

Referring to FIG. 2A, the beam propagates along the length of the waveguide 30b and is incident upon the light lens 19 of the optical load, e.g. a taillight lens. A critical feature of the invention is that the beam, exiting the waveguide 30b, is sufficiently diffuse so as to be harmless when the beam is viewed with the naked eye. This is at least partially accomplished by having the laser in a remote location from the optical load because the fiber reduces the laser brightness. That is, the laser power being emitted from, for example, a 1 μm by 100 μm emission aperture diode laser array consisting of 10 lasing elements on 10 μm centers may be coupled into a 400 μm fiber, thereby reducing the power per unit area by several orders of magnitude. This improves the safety of the source by reducing its brightness.

In addition, a diffuser or diffuser lens combination 32 is provided to receive the beam exiting the waveguide 30b. In accord with this concern for safety, a fail-safe switch 20 could be operationally coupled to both the laser light sources 25 and each waveguide so that the switch 20 terminates the beam should the waveguide become misaligned with the optical axis of the diffusing lens 32. This prevents undiffused laser light from being viewed by the naked eye.

Figure 2B:
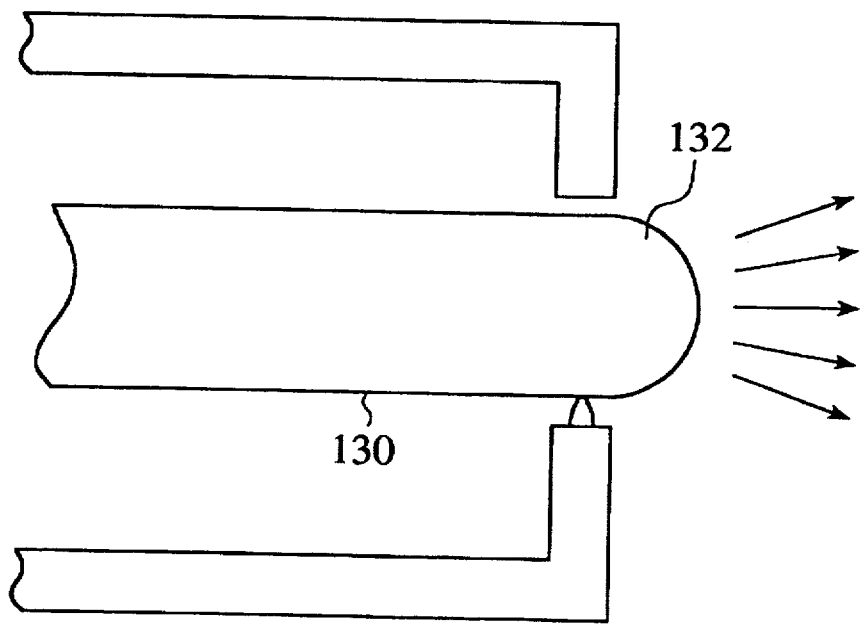
FIG. 2B is a plan view of a fiber optic waveguide shown in FIG. 2A according to an alternate embodiment of the present invention.

FIG. 2B shows a diffuser lens 132 integrally formed at one end of the waveguide 130. This may be formed by melting the fiber to achieve the desired diffusivity of the exiting beam.

Figure 2C:
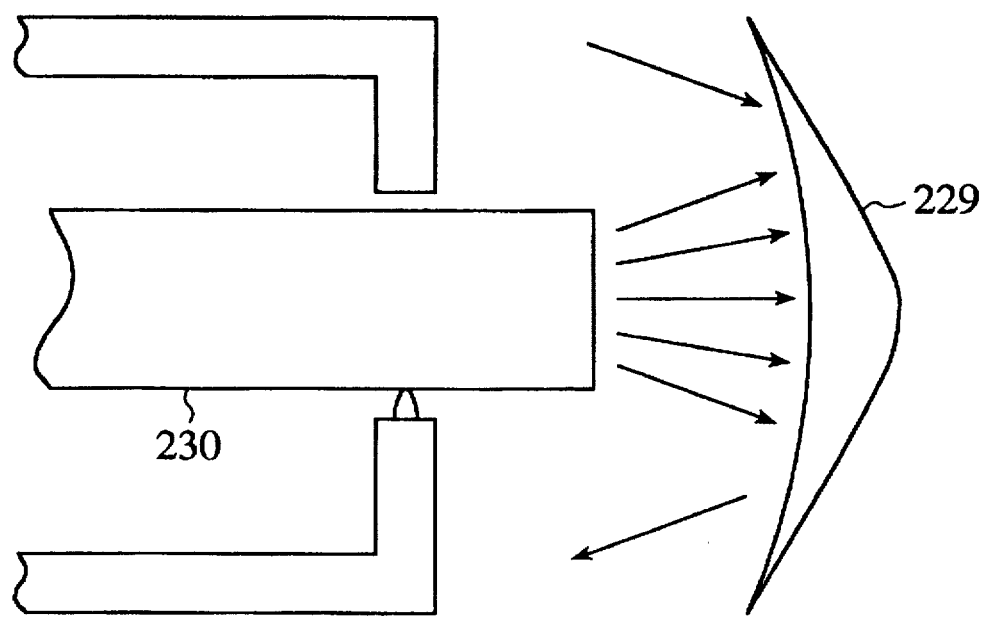
FIG. 2C is a plan view of a fiber optic waveguide shown in FIG. 2A optically coupled to a reflective surface according to an alternate embodiment of the present invention.

FIG. 2C shows a reflecting surface 229 positioned to receive light exiting the waveguide 230. In this embodiment, the reflecting surface 229 may be composed of a high efficiency reflecting diffusing material, reflecting 70 to 95 percent of the light exiting the waveguide 230. Also, the reflecting surface 229 may be composed of non-diffusing material, wherein a diffusing lens is interposed between the waveguide 230 and the reflecting surface to diffuse the exiting radiation.

Figure 8:
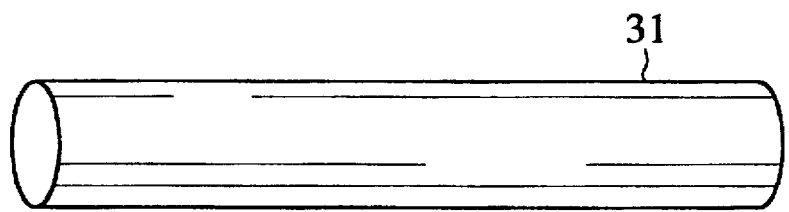
FIG. 8 is a perspective view showing a cylindrical lens employed in accord with the present invention.
Figure 3:
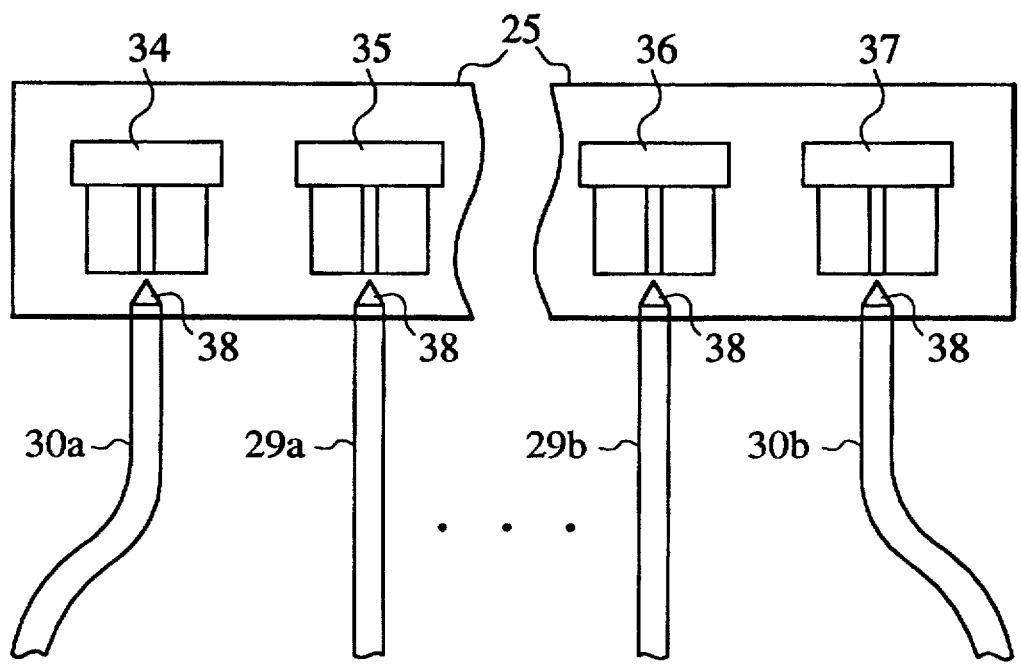
FIG. 3 is a plan view of the conveniently located group of laser light sources shown in FIG. 1 that includes an array of discrete laser diodes according to the present invention.

FIG. 3 shows the preferred embodiment in which a plurality of semiconductor laser light sources, such as diode lasers or diode laser bars 34, 35, 36 and 37, are shown. Although four laser sources are shown, any number may be present. Each of the laser light sources 34, 35, 36 or 37 emits a beam 38 which couples to one of a plurality of fiber optic waveguides 29a, 29b, 30a and 30b. It should be understood that each laser light source is discrete and thus is capable of being addressed individually, thereby generating a beam separately from the other laser sources. Each of the fiber optic waveguides extends distally to an optical load of the vehicle, as discussed above. It is desired to butt-couple the fiber optic waveguides to the laser sources. However, in some instances it might be necessary to focus the light into the fiber with, for example, a cylindrical lens 31 shown in FIG. 8. The fiber optic waveguide is then aligned with the cylindrical lens for efficient coupling.

Figure 4:
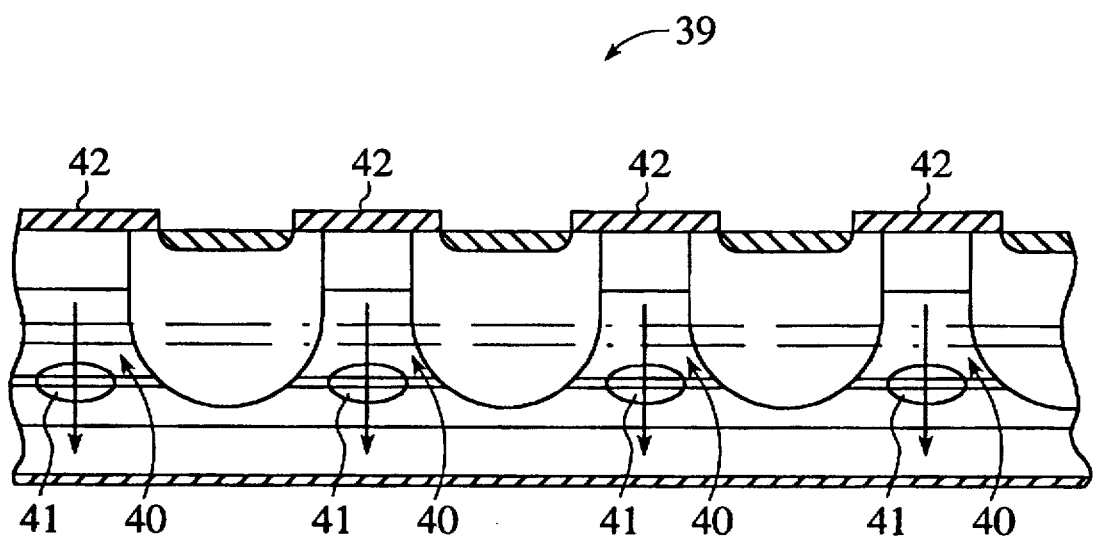
FIG. 4 is a front end view of the conveniently located group of laser light sources shown in FIG. 1 that includes a monolithic array of laser diodes according to an alternate embodiment of the present invention.

An alternative to the plurality of semiconductor light sources 34, 35, 36 and 37, is to provide a monolithic array of laser light sources, shown as 39 in FIG. 4. The monolithic array includes a plurality of emitter regions 40, each of which can generate a beam of light 41. Each emitter region 40 includes a contact 42 that can be addressed individually with a different bias voltage and different current, which in turn injects the voltage and current into the respective emitter region 40. The beam 41 generated by each emitter region 40 can thus be controlled separately from the others.

Figure 5:
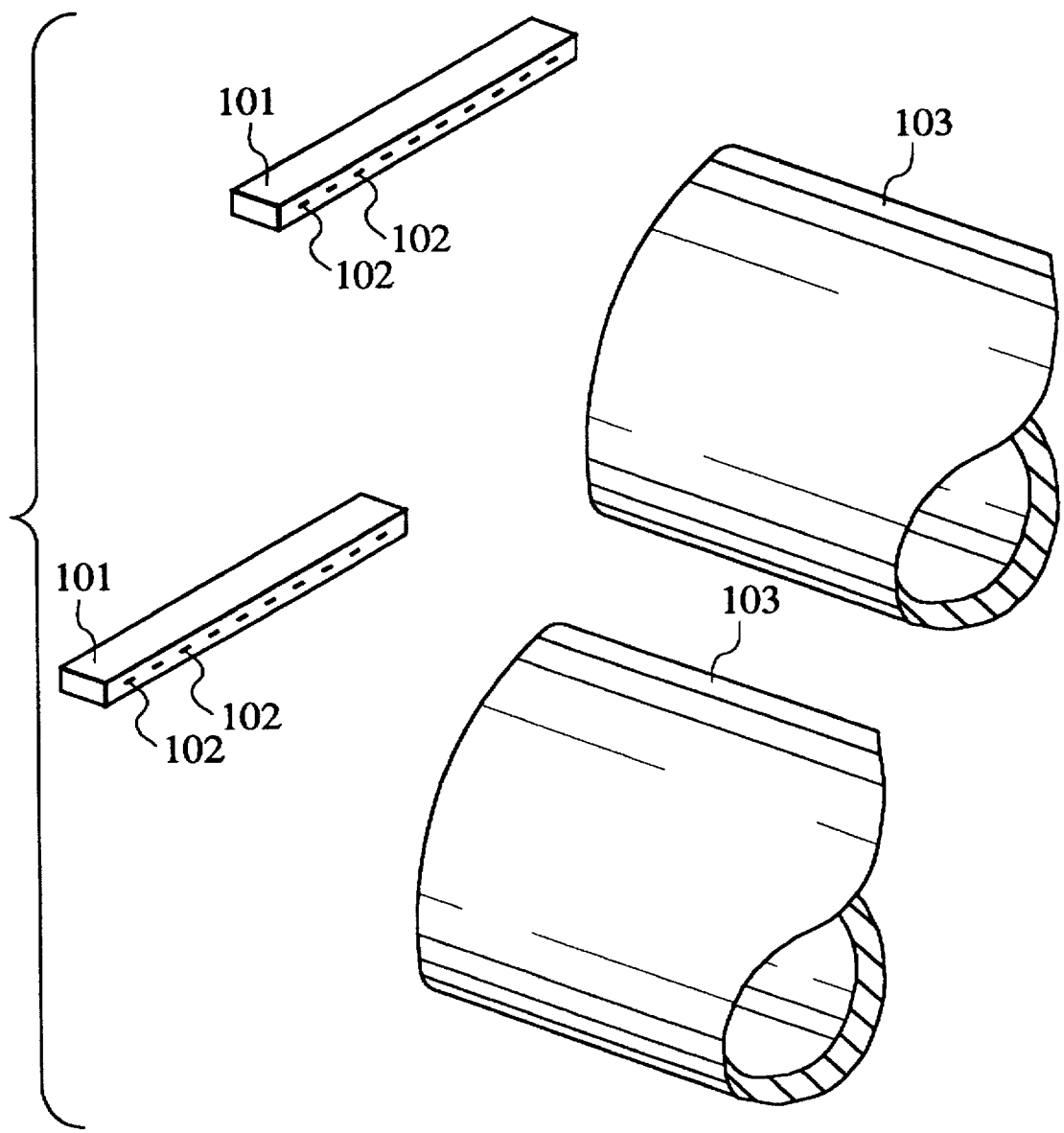
FIG. 5 is a perspective view showing a plurality of laser light sources optically coupled to a fiber optic waveguide according to an alternate embodiment of the present invention.

FIG. 5 shows an embodiment wherein each laser light source 101 includes a plurality of light emitting segments 102, with each fiber optic waveguide 103 coupled to a plurality of light emitting segments 102. Although FIG. 5 shows the waveguide 103 spaced apart from the laser light source 101, typically, the waveguide 103 abuts it. The numerical aperture of the waveguide 103 is matched with the divergence angle of the laser light source 101, and fibers 103 are aligned with the laser emitting regions 102. By having multiple separate emitters 102 enter each fiber 103, redundancy occurs, allowing freedom from failures. In addition, laser speckle may be reduced by reducing the overall coherence of the output beam. Emitters 102 with different colors/wavelengths may be mixed in a fiber 103 to generate new colors other than the primary initial colors. This can create pleasing panel light colors inside the vehicle. Thus, in this configuration, each optical load of the vehicle will have a plurality of laser segments associated with it. The segments are individually addressable which allows one segment to operate at a time. When one segment fails, another may be operated in its place. This redundancy provides a longer lasting array of lasers and adds high reliability without substantially increasing the cost of the laser array. Alternatively, an emitter producing different colors/wavelengths may be optically coupled to different loads.

Figure 6:
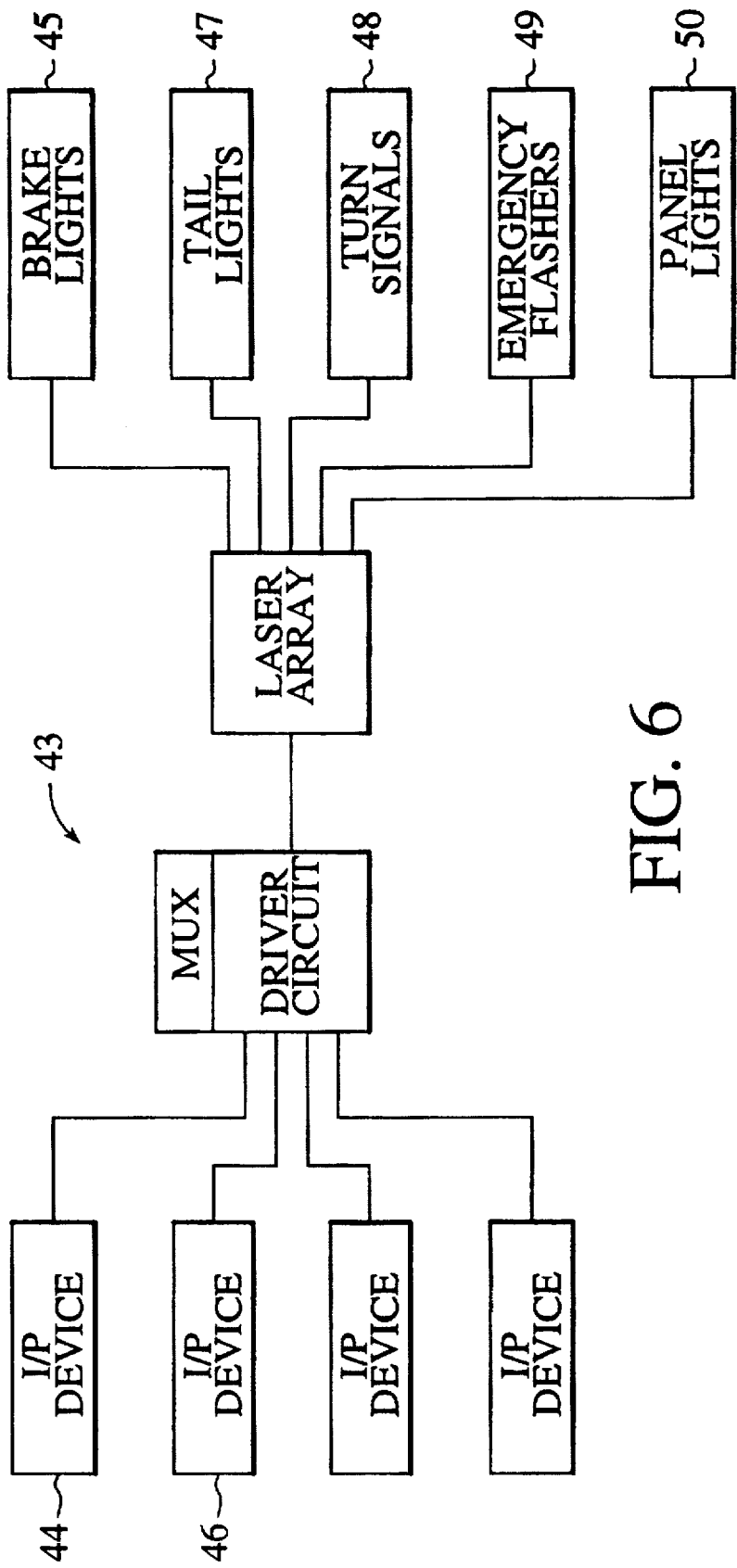
FIG. 6 is a block diagram of the laser taillight system according to the present invention.

FIG. 6 shows a driver circuit 43 electrically coupled between each laser light source and a corresponding input device. The driver circuit 43 is provided to take advantage of individually addressing each laser light source. It includes a multiplexer which permits control of each laser light source independent of the others. For example input device 44 is associate with the brake pedal. When the brake pedal is depressed, it transmits a signal to the driver circuit 43 which in turn causes the appropriate laser light source to emit a beam, wherein the beam propagates along fiber optic waveguides to illuminate the brake lights 45. Input device 46 is associated with the taillights. When the taillights 47 are activated, input device 46 transmits a signal to the driver circuit 43 which in turn causes the appropriate laser light sources to emit a beam, wherein the beams propagate along fiber optic waveguides to illuminate the taillights 47. Other input devices could be connected to the driver circuit 43, to operate other optical loads, e.g., turn signals 48, emergency flashers 49 and panel lights 50.

In addition, the driver circuit is capable of increasing the current to each laser light source individually. This allows the driver circuit to adjust the brightness of each laser light source individually, thereby compensating for the effects of thermal wear or the ambient light level. This adjustment could be performed manually, or automatically by processor control.

Figure 7:
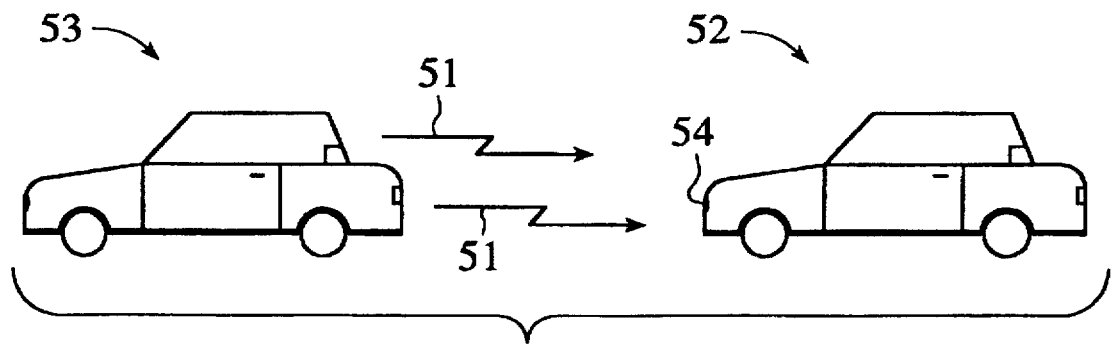
FIG. 7 is a side view demonstrating inter-vehicle communication according to one embodiment of the present invention.

Finally, any of the output ports, 45–49 for example, could transmit a data signal to a high speed light detector at another location, e.g., on another vehicle. Referring to FIG. 7, this high speed data signal 51 could signal to a second vehicle 52 information concerning the operation of the first vehicle 53, e.g. its velocity or rate of deceleration. This would allow speed adjustment within the second vehicle. An infrared laser could be used for this purpose, as well as lasers transmitting visible light. The modulation rates of these lasers could be from 0–1 Ghz, if required. A rapidly flashing red brake light at approximately 10–30 Hz would be visually perceivable by the other driver of the second vehicle 52. A light detector, such as Si detector 54, could be employed to sense a signal modulated at a much higher frequency which is incapable of visual perception by a person, e.g. a flashing light modulated at a frequency exceeding 60 Hz.

I claim:

1. A vehicle lighting system comprising:
   a plurality of semiconductor light emitters grouped together, each emitter adapted to generate a beam,
   a plurality of optical loads mounted on a vehicle, and
   means for transmitting at least one of said beams to each of said optical loads, wherein said plurality of semiconductor light emitters includes a subset of selectively controllable semiconductor light emitters coupled to one of said optical loads, with said plurality of emitters being in a fixed spatial relationship with respect to said transmitting means.

2. The vehicle lighting system of claim 1 wherein each of said plurality of emitters is coupled to said transmitting means, said transmitting means including a plurality of optical fibers, at least one fiber associated with each emitter.

3. The vehicle lighting system of claim 1 wherein each of said plurality of emitters is distally positioned from each of said plurality of optical loads, each of said emitters being separately controllable from the others.

4. The vehicle lighting system of claim 1 further including means, connected to each of said plurality of emitters, for maintaining a temperature of said emitters at a predetermined temperature.

5. The vehicle lighting system of claim 1 further including a diffuser positioned between said transmitting means and each of said plurality of optical loads to diffuse a beam exiting said transmitting means.

6. The vehicle lighting system of claim 1 further including a focusing means for controlling the divergence or direction of a beam exiting said transmitting means.

7. The vehicle lighting system of claim 6 further including a means, positioned between said transmitting means and each of said plurality of optical loads, for diffusing said beam exiting said transmitting means.

8. The vehicle lighting system of claim 1 wherein each of said plurality of emitters is a semiconductor laser.

9. The vehicle lighting system of claim 1 wherein said subset comprises one of said plurality of emitters.

10. The vehicle lighting system of claim 1 further including means for modulating each of said plurality of emitters to create a flashing light, said flashing light transmitting data to a light receiver located away from the vehicle containing the modulating means.

11. The vehicle lighting system of claim 10 wherein said flashing light is amplitude modulated.

12. The vehicle lighting system of claim 1 wherein at least two of said plurality of emitters transmits a beam having a wavelength, different from the remaining emitters, to a single optical load.

13. The vehicle lighting system of claim 1 wherein at least two of said plurality of emitters transmits a beam having a wavelength, different from the remaining emitters, to different optical loads.

14. The vehicle lighting system of claim 1 wherein said plurality of emitters are semiconductor lasers fabricated from material containing elements selected from the group consisting of N, In, Ga, Al, As and P.

15. The vehicle lighting system of claim 14 wherein the temperature of said plurality of emitters is controlled by a thermo-electric cooler.

16. The vehicle lighting system of claim 1 wherein said plurality of semiconductor light emitters is a monolithic array of laser emitters.

17. The vehicle lighting system of claim 1 further including a means for adjusting an intensity of said beam produced by each of the plurality of light emitters, independent of the remaining semiconductor light emitters.

18. A vehicle lighting system comprising:
   a plurality of semiconductor light emitters grouped together, each emitter adapted to generate a beam,
   a plurality of optical loads mounted on a vehicle, and
   means for transmitting at least one of said beams to each of said optical loads, with said plurality of emitters being in a fixed spatial relationship with respect to said transmitting means, each of said plurality of optical loads being uniquely associated with a subset of said plurality of emitters, with said subset of emitters being mutually exclusive of emitters forming subsets associated with the remaining optical loads.

19. The vehicle lighting system of claim 18 further including a plurality of input devices, with each of said plurality of input devices being uniquely associated with one of said plurality of optical loads and each of said plurality of optical loads being uniquely associated with one of said plurality of input devices, whereby each of said plurality or input devices activates a subset of said plurality of semiconductor light emitters optically coupled to said one of said plurality of optical loads.

20. The vehicle lighting system of claim 18 further including a plurality of input devices, with each of said input devices being associated with a plurality of optical loads, whereby each of said plurality of input devices activates a subset of said plurality of semiconductor light emitters optically coupled to said one of said optical loads.

21. The vehicle lighting system of claim 18 further including a means, positioned between one of said plurality of waveguides and one of said plurality of optical loads, for diffusing a beam exiting said one of said plurality of waveguides.

22. The vehicle lighting system of claim 18 further including multiplexing means, in data communication with said plurality of semiconductor light emitters, for individually addressing each of said plurality of emitters to generate said beam independent of the remaining semiconductor light emitters.

23. The vehicle lighting system of claim 22 wherein said multiplexing means includes a means for increasing a current through each of said plurality of semiconductor light emitters, wherein each of said plurality of semiconductor light emitters has the brightness of a beam emitted thereby adjusted to compensate for variations in beam intensity.

24. The vehicle lighting system of claim 18 further including means for modulating each of said plurality of semiconductor light emitters to create a flashing light, said flashing light transmitting data to a light receiver located away from the vehicle containing said modulating means.

25. The vehicle lighting system of claim 24 wherein said flashing light is amplitude modulated.

26. The vehicle lighting system of claim 18 wherein at least two of each of said plurality of semiconductor light emitters transmit a beam having a wavelength, different from the remaining emitters, to a single optical load.

27. The vehicle lighting system of claim 18 wherein at least two of said plurality of semiconductor light emitters transmit a beam having a wavelength, different from the remaining emitters, to different optical loads.

28. A vehicle lighting system comprising:

a plurality of semiconductor light emitters grouped together, each emitter adapted to generate a beam, a plurality of optical loads mounted on a vehicle, and means for transmitting at least one of said beams to each of said optical loads, with said plurality of emitters being in a fixed spatial relationship with respect to said transmitting means, said plurality of emitters comprised of a monolithic array of laser emitters distally positioned from each of said plurality of optical loads, each of said plurality of laser emitters being separately controllable from the others and separately coupled to said transmitting means, said transmitting means including a plurality of optical fibers, said plurality of optical fibers extending from a laser emitter and terminating proximate to an optical load, thereby transmitting said beam thereto.

29. The vehicle lighting system of claim 28 further including a means, positioned between one of said plurality of waveguides and one of said plurality of optical loads, for diffusing a beam exiting said one of said plurality of waveguides.

30. The vehicle lighting system of claim 28 further including multiplexing means, in data communication with said array of laser emitters, for individually addressing each of said laser emitters to generate said beam independent of the remaining laser emitters.

31. The vehicle lighting system of claim 30 wherein said multiplexing means includes a means for increasing a current through each of said laser emitters, wherein each laser emitter has the brightness of a beam emitted thereby adjusted to compensate for variations in beam intensity.

32. The vehicle lighting system of claim 28 further including means for modulating each of said laser emitters to create a flashing light, said flashing light transmitting data to a light receiver located away from the vehicle containing said modulating means.

33. The vehicle lighting system of claim 32 wherein said flashing light is amplitude modulated.

34. The vehicle lighting system of claim 28 wherein at least two laser emitters transmit a beam having a wavelength, different from the remaining emitters, to a single optical load.

35. The vehicle lighting system of claim 28 wherein at least two laser emitters transmit a beam having a wavelength, different from the remaining emitters, to different optical loads.

36. A vehicle lighting system comprising:

a plurality of optical loads mounted on a vehicle, a plurality of grouped together laser light sources, each of which is adapted to produce a coherent beam of light, at least one of said plurality of laser light sources being separately controllable from the others, a plurality of optical fibers each of which is optically coupled to receive said beam from at least one of said plurality of laser light sources, each of said plurality of fibers extending from a laser light source, terminating proximate to an optical load, wherein there is at least one fiber associated with each of said plurality of optical loads, means, connected to said grouped together light sources, for individually driving at least one of said plurality of laser sources to produce said beam, and a plurality of input switches connected to said driving means, whereby at least one of said plurality of laser light sources is associated with an input switch and said driving means and causes said laser light sources to transmit light in response to an activation of said input switch.

37. The vehicle lighting system of claim 36 wherein at least two of said plurality of light sources are optically coupled to each of said plurality of waveguides.

38. The vehicle lighting system of claim 36 further including means, connected to said plurality of grouped together laser light sources, for maintaining the temperature of said plurality of laser light sources at a predetermined temperature.

39. The vehicle lighting system of claim 36 wherein said plurality of grouped together light sources are a monolithic array of laser diodes.

40. The lighting system of claim 36 wherein each of said plurality of waveguides is an optical fiber.

41. The lighting system of claim 36 wherein each of said plurality of waveguides is a plurality of fibers bundled together.

42. The vehicle lighting system of claim 36 further including a means, positioned between each of said plurality of waveguides and each of said plurality of optical loads, for diffusing a beam exiting each of said plurality of waveguides.

43. The vehicle lighting system of claim 36 further including a means for adjusting an intensity of said beam produced by each of the plurality of laser light sources, independent of the remaining laser light sources.

44. A vehicle signaling apparatus comprising:

a plurality of optical loads mounted on a first vehicle, a monolithic array of laser diodes distally positioned from each of said plurality of optical loads, said laser array including a plurality of laser emitters, each of which produces a beam of coherent light, at least one of said plurality of laser emitters being separately controllable from the others, a plurality of fiber optic waveguides with at least two of said plurality of laser emitters optically coupled to each of said plurality of waveguides, each of said plurality of waveguides extending from said laser array and terminating proximate to an optical load, wherein there is at least one of said plurality of waveguides associated with each of said plurality of optical loads, means, connected to said array, for individually driving at least one of said plurality of laser emitters to transmit light, a plurality of input switches electronically coupled to said driving means to transmit a signal thereto upon activation, whereby at least one laser emitter associating with an input switch and said driving means causes said laser emitter to transmit light in response to said signal.

45. The vehicle lighting system of claim 44 wherein each of said plurality of waveguides includes an optical fiber.

46. The vehicle lighting system of claim 44 wherein each of said plurality of waveguides includes a plurality of optical fibers bundled together.

47. The vehicle lighting system of claim 44 wherein said plurality of optical loads comprises at least two optical loads from the group consisting of taillights, brake lights, instrumentation lights, a collision avoidance light and turn signals.

48. The vehicle lighting system of claim 47 further including a means, positioned between each of said plurality of waveguides and each of said plurality of optical loads, for diffusing a beam exiting each of said plurality of waveguides.

49. The vehicle lighting system of claim 48 wherein said driving means includes a means for increasing a current through each of said plurality of laser emitters, wherein each of said plurality of laser emitters has the brightness of a beam emitted thereby adjusted to compensate for variations in beam intensity.

50. The vehicle lighting system of claim 44 further including a means for adjusting an intensity of said beam produced by each of the laser diodes, independent of the remaining laser diodes.

* * * * *